(12) United States Patent
Proudkii et al.

(10) Patent No.: US 8,128,788 B2
(45) Date of Patent: Mar. 6, 2012

(54) METHOD AND APPARATUS FOR TREATING A PROCESS VOLUME WITH MULTIPLE ELECTROMAGNETIC GENERATORS

(75) Inventors: Vassilli P. Proudkii, Edmonton (CA); Kirk McNeil, Edmonton (CA); Joe Michael Yarborough, Tucson, AZ (US)

(73) Assignee: RF Thummim Technologies, Inc. (CA)

( * ) Notice: Subject to any disclaimer, the term of this patent is extended or adjusted under 35 U.S.C. 154(b) by 99 days.

(21) Appl. No.: 12/420,770

(22) Filed: Apr. 8, 2009

(65) Prior Publication Data

US 2009/0260973 A1 Oct. 22, 2009

Related U.S. Application Data

(63) Continuation-in-part of application No. 12/234,503, filed on Sep. 19, 2008.

(51) Int. Cl.
C07C 2/00 (2006.01)
C07C 4/00 (2006.01)
C07C 5/00 (2006.01)
C07C 6/00 (2006.01)
B01J 19/08 (2006.01)

(52) U.S. Cl. ............... 204/157.15; 422/186; 422/186.01; 422/186.03

(58) Field of Classification Search ............. 204/157.15; 422/186, 186.01, 186.03
See application file for complete search history.

(56) References Cited

U.S. PATENT DOCUMENTS

| | | | | |
|---|---|---|---|---|
| 2,676,257 A * | 4/1954 | Hebenstreit | ................... | 343/768 |
| 2,714,661 A * | 8/1955 | Norton | ............... | 331/3 |
| 3,170,519 A | 2/1965 | Haagensen | ..................... | 166/60 |
| 3,442,758 A * | 5/1969 | Penfold et al. | ................... | 315/39 |
| 3,588,594 A * | 6/1971 | Matsuno et al. | ......... | 315/111.21 |
| 3,882,424 A * | 5/1975 | Debois et al. | ................. | 332/127 |
| 4,004,122 A | 1/1977 | Hallier | .......................... | 219/697 |
| 4,153,533 A | 5/1979 | Kirkbride | ............... | 204/157.15 |
| 4,279,722 A | 7/1981 | Kirkbride | ............... | 204/157.15 |
| 4,435,260 A | 3/1984 | Koichi et al. | ................. | 204/164 |
| 4,565,670 A * | 1/1986 | Miyazaki et al. | ........ | 422/186.04 |
| 4,631,380 A * | 12/1986 | Tran | ............... | 219/697 |
| 4,728,368 A * | 3/1988 | Pedziwiatr | ..................... | 422/20 |
| 4,883,570 A | 11/1989 | Efthimion et al. | ............ | 204/164 |
| 4,922,180 A * | 5/1990 | Saffer et al. | .................... | 324/639 |
| 4,934,561 A | 6/1990 | Ness et al. | ........................ | 222/1 |
| 4,957,606 A | 9/1990 | Juvan | ............................. | 204/164 |
| 4,968,403 A | 11/1990 | Herbst et al. | ................. | 208/113 |

(Continued)

FOREIGN PATENT DOCUMENTS

WO WO 2009/039521 3/2009

OTHER PUBLICATIONS

Extended European Search Report dated Nov. 8, 2010, (9 pgs).

(Continued)

*Primary Examiner* — Keith Hendricks
*Assistant Examiner* — Colleen M Raphael
(74) *Attorney, Agent, or Firm* — Hayes Soloway P.C.

(57) ABSTRACT

A method and apparatus are described that couples a plurality of electromagnetic sources to a material for the purpose of either processing the material or promoting a chemical reaction. The apparatus couples various electromagnetic sources of various frequencies, including provision for static magnetic fields, radio frequency fields, and microwave fields, with the possibility of applying them all simultaneously or in any combination.

36 Claims, 7 Drawing Sheets

Figure 1

U.S. PATENT DOCUMENTS

| | | | | |
|---|---|---|---|---|
| 5,114,684 | A * | 5/1992 | Walker | 422/21 |
| 5,200,043 | A | 4/1993 | Ooe et al. | 204/130 |
| 5,262,610 | A | 11/1993 | Huang et al. | 219/121.43 |
| 5,279,669 | A | 1/1994 | Lee | 118/723 |
| 5,447,052 | A | 9/1995 | Delaune et al. | 73/19.09 |
| 5,507,927 | A | 4/1996 | Emery | 204/157.43 |
| 5,521,605 | A * | 5/1996 | Koike | 343/702 |
| 5,539,209 | A * | 7/1996 | Maarschalkerweerd | 422/24 |
| 5,540,886 | A | 7/1996 | Warmbier et al. | 422/21 |
| 5,834,744 | A | 11/1998 | Risman | 219/697 |
| 5,902,404 | A | 5/1999 | Fong et al. | 118/723 |
| 5,911,885 | A * | 6/1999 | Owens | 204/155 |
| 5,914,014 | A | 6/1999 | Kartchner | 204/157.15 |
| 6,027,698 | A * | 2/2000 | Cha | 422/186 |
| 6,077,400 | A | 6/2000 | Kartchner | 204/157.15 |
| 6,187,988 | B1 | 2/2001 | Cha | 588/227 |
| 6,193,878 | B1 | 2/2001 | Morse et al. | 422/186 |
| 6,207,023 | B1 * | 3/2001 | Cha | 204/157.3 |
| 6,261,525 | B1 | 7/2001 | Minaee | 422/186 |
| 6,409,975 | B1 * | 6/2002 | Seyed-Yagoobi et al. | 422/186 |
| 6,419,799 | B1 * | 7/2002 | Cha | 204/157.3 |
| 6,572,737 | B2 * | 6/2003 | Dalton | 204/157.15 |
| 6,576,127 | B1 * | 6/2003 | Ohkawa | 422/186.01 |
| 6,592,723 | B2 * | 7/2003 | Cha | 204/157.52 |
| 6,621,525 | B1 * | 9/2003 | Ueda et al. | 348/618 |
| 6,683,272 | B2 | 1/2004 | Hammer | 219/121.48 |
| 6,689,252 | B1 * | 2/2004 | Shamouilian et al. | 204/157.15 |
| 6,696,662 | B2 | 2/2004 | Jewett et al. | 219/121.48 |
| 6,740,858 | B2 | 5/2004 | Tracy et al. | 422/186 |
| 6,809,310 | B2 * | 10/2004 | Chen | 315/111.81 |
| 6,888,116 | B2 | 5/2005 | Dalton | 219/745 |
| 6,933,482 | B2 | 8/2005 | Fagrell et al. | 219/695 |
| 7,210,424 | B2 * | 5/2007 | Tolmachev | 118/723 MW |
| 7,227,097 | B2 | 6/2007 | Kumar et al. | 219/121.43 |
| 7,495,443 | B2 * | 2/2009 | Leussler et al. | 324/318 |
| 7,629,497 | B2 | 12/2009 | Pringle | 585/241 |
| 2004/0074760 | A1 | 4/2004 | Portnoff et al. | 204/157.15 |
| 2005/0155854 | A1 * | 7/2005 | Shufflebotham et al. | 204/164 |
| 2006/0073084 | A1 | 4/2006 | Burkitbayev | 422/186 |
| 2006/0102622 | A1 | 5/2006 | Gregoire et al. | 219/695 |
| 2007/0102279 | A1 | 5/2007 | Novak | 204/157.6 |
| 2007/0131591 | A1 | 6/2007 | Pringle | 208/402 |
| 2007/0240975 | A1 | 10/2007 | Foret | 204/157.15 |
| 2008/0202982 | A1 | 8/2008 | Tooley | 208/106 |
| 2008/0233020 | A1 * | 9/2008 | Purta et al. | 422/186 |
| 2009/0260973 | A1 | 10/2009 | Proudkii et al. | 204/164 |

OTHER PUBLICATIONS

Official Actions cited in U.S. Appl. No. 12/234,503 dated Feb. 4, 2011 and Sep. 29, 2010.
Official Action dated Aug. 2, 2011 issued in U.S. Appl. No. 12/234,503 (25 pgs).
PCT Search Report and Written Opinion, International Appln. No. PCT/US2011/028810, dated Mar. 17, 2011, (10 pages).
US Official Action issued in corresponding U.S. Appl. No. 12/234,503 dated Dec. 7, 2011 (30 pgs).

* cited by examiner

METHOD AND APPARATUS FOR TREATING A PROCESS VOLUME WITH MULTIPLE ELECTROMAGNETIC GENERATORS

CROSS REFERENCE TO RELATED APPLICATION

This application is a continuation-in-part of copending U.S. application Ser. No. 12/234,503, filed Sep. 19, 2008, the contents of which are incorporated herein by reference.

FIELD OF THE INVENTION

This invention relates generally to processing or reaction of materials. The invention has particular utility in the use of electromagnetic energy to promote a chemical process or reaction, such as the breaking of chemical bonds in large molecules and will be described in connection with such utility, although other utilities are contemplated. An example of this is to break molecular bonds in long hydrocarbon chains so that shorter chain and lower weight hydrocarbons are created. Such a process could for example reduce heavy, viscous oil to a less viscous consistency so that it can be more easily transported through a pipe.

BACKGROUND OF THE INVENTION

Petroleum-based materials are integral to the world's economy and demand for petroleum based fuels and petroleum based products is increasing. As the demand rises, there is a need to efficiently and economically process petroleum-based materials to fulfill that demand. As such, it would be advantageous to not only be able to process raw petroleum-based materials from the earth, but to recycle consumer products to recapture those petroleum-based materials.

Worldwide oil consumption is estimated at in excess of seventy million barrels per day and growing. Thus, there is a need for sufficient oil supplies. Tar sands, oil sands and oil shales, contain large quantities of oil; however, extraction of oil from these materials is costly and time-consuming.

Pumping heavy oil from oil sands is difficult. Typically, up to 30% by volume of a solvent or diluent must be added to such oil to make it thin enough to pump through pipelines. This adds a cost of as much as 15% to a barrel of oil at current prices. Thus, the ability to economically break some of the molecular bonds to make the oil less viscous could have a significant impact on the recovery of useful products from oil sands. Another problem that is becoming increasingly important is the disposal of toxic wastes. Generally to render wastes harmless requires breaking chemical bonds in the waste and possibly then adding other substances to form new bonds.

In prior art, it is known that a process or reaction volume can be excited in a resonant electromagnetic structure with an electromagnetic generator coupled to it. The structure is generally multimode (i.e., multi-spatial mode). A microwave oven is an example of such an apparatus.

The resonant structure also may be a single mode structure, wherein a single frequency is resonant in a single spatial mode. A single mode resonant structure is smaller than a multimode resonant structure and cannot handle as much power input. In many applications, it is desirable to create a plasma in a process or reaction volume, and it is generally easier in a single mode resonant structure to establish a stable plasma and to maintain matching to the generator and its delivery system.

It also is known that a reaction or process volume can be excited in a multimode resonant structure coupled to a plurality of electromagnetic generators. For example, U.S. Pat. No. 7,227,097 describes a system using multiple generators coupled to a common multimode resonant structure, with a plasma created in the common resonant cavity. This configuration has the advantage of permitting more input power, but the multimode cavity is far more sensitive to plasma fluctuations. Matching and maintaining the electromagnetic generators and their respective delivery systems also is difficult in this configuration. There also is more cross-coupling of the various generators through plasma instabilities. Prior art references also provide multiple generator inputs for a single mode resonant structure, but in the single mode configuration each generator would be required to have the same frequency and phase, and the resonant structure would limit how much power could be applied.

In many cases, it is necessary to use very high frequencies, for example microwaves. Generation of microwave energy (roughly 300 MHz to 300 GHz) from input electrical energy is typically only about 50 to 70% efficient. By comparison, generation of lower radio frequency (roughly 455 KHz to 300 MHz) energy conversion is up to 95% efficient.

In some processes or reactions, it becomes necessary to use microwave energy. For example, in many applications it is necessary to form a plasma using microwave frequencies, but it would be very advantageous to further heat the plasma using lower frequencies that can be generated more efficiently. Further, in a microwave resonant structure, generally the plasma is not uniformly heated along the length of a process or reaction chamber.

Accordingly, there is a need for an improved method and apparatus for treating a process volume with increased efficiency. Specifically, it is desirable to excite the plasma uniformly along the length of the reaction chamber and to utilize lower radio frequency energy conversion.

SUMMARY OF THE INVENTION

To address the requirements described above, the present invention discloses a method and apparatus for treating a process or reaction volume with multiple electromagnetic generators. This is accomplished in the present invention by using higher order microwave modes in the resonant structure and by using a unique structure that permits the additional use of RF radiation at a lower frequencies.

In contrast to prior art (Hammer, U.S. Pat. No. 6,683,272 B2, Jan. 27, 2004) where a rectangular waveguide is used as a resonant cavity, the present invention uses a circular resonant structure. Unique physical structures are disclosed that allow the application of several frequencies, including static fields as well as alternating fields of various frequencies simultaneously, to the reaction or process volume. Additionally, the use of a circular geometry allows much greater internal power than the rectangular geometry. Also disclosed is a means to remove reaction or process products from the resonant structure walls during operation by applying acoustic vibration to the structure.

In the case of plasma formation, use of the circular geometry with appropriate transverse electric (denoted as TElmn) resonator modes allows confinement of a plasma to the axis of the reaction or process chamber, thus allowing more efficient heating of the reaction or process volume by applying a magnetic field that is transverse to the electric field and by additionally applying a radio frequency field. In addition, a static solenoidal field may be added to help confine the plasma to the resonator axis.

By operating the resonant structure in many spatial modes at once and by employing the unique structure herein disclosed, it is possible to apply more power by using more generators and to more uniformly excite the medium being acted upon along the length of the resonant structure.

Co-pending U.S. application Ser. No. 12/234,503 filed Sep. 19, 2008, assigned to a common assignee and incorporated by reference herein, provides a system, i.e. a method and apparatus for treating a process or reaction volume with multiple electromagnetic generators by applying the output of several electromagnetic generators to respective resonant structures, with the several resonant structures then coupled to a common process or reaction volume. The application further discloses methods for matching and tuning the electromagnetic generators to their respective resonant structures, for controlling the power input to each resonant structure, and for controlling the phase of any inputs that have the same resonant frequency. The various resonant structures are arranged such that the reaction or process volume is a part of each resonant structure. In this configuration, the generators can have different frequencies and phases, and still be matched to a common process or reaction volume. Only the process or reaction volume limits the amount of power that can be inputted. Thus, the system combines the advantages of multiple inputs and increased stability by having each generator coupled to its own resonant structure, wherein each resonant structure is in turn coupled to the common process or reaction volume.

It is therefore an object of the present invention to provide a method and apparatus to couple lower, radio frequency (RF) electromagnetic sources to the reaction and process volume in addition to the microwave sources. It is further an object of the present invention to provide for a static magnetic field. In order to accomplish this, the process or reaction chamber is arranged such that several microwave modes are simultaneously resonant in the structure. This permits more even and greater excitation of the material being processed or reacted upon.

It is another object of the present invention to allow several microwave inputs of the same or different frequencies. For the present invention, generators with the same frequency are locked in phase. Each generator is coupled to the appropriate resonant mode both mechanically and electronically match the resonant modes of the reaction or process chamber and to facilitate keeping the sources matched to the chamber when the load changes. This is especially important in the case where a plasma is established in the reaction chamber. In such a case, the load changes dramatically when a plasma forms. The present invention further provides electronic and mechanical tuning for matching of the microwave generators to the process or reaction chamber and allows rapid adjustment for maintaining matching to the load.

In one aspect, the present disclosure provides an apparatus for exciting a process medium with electromagnetic radiation comprising: a reaction structure containing a process or reaction volume; at least one microwave electromagnetic generator, preferably a plurality of microwave electromagnetic generators, coupled to the reaction structure; and at least one radio frequency (RF) electromagnetic generator coupled to the reaction structure. The process or reaction chamber preferably is cylindrically symmetric, and the microwave sources are arranged such that only transverse electric (TE, or H) modes are excited. Such modes are designated as TElmn modes. In these modes the electric field is circumferential and parallel to the walls of the resonant chamber and the magnetic field is parallel to the axis. The inputs from the multiple microwave generators are arranged so that the various generators are coupled to various modes of the resonant structure. In many cases, modes that are circumferentially invariant are used. Such modes are designated TEomn modes.

In another aspect, the present disclosure provides an apparatus for treating a process volume with multiple electromagnetic generators, comprising a resonant structure, formed of a metal spiral and a plurality of electromagnetic generators coupled to the spiral. The resonant structure itself is made of a metal spiral whose turns can have a width equal to a fraction of a wavelength at the resonant frequency. See FIG. 1. A radio frequency (RF) source can be connected across several of the turns of the coil. At the RF frequency the turns of the coil appear as an inductance. A capacitor sometimes is used to make the circuit resonant at the RF frequency. This arrangement provides an alternating magnetic field parallel to the axis of the coil allowing adding energy to the material being processed or reacted upon.

In yet another aspect, the present disclosure provides a method of exciting a process medium using a magnetic field, comprising: providing a resonant structure that is substantially cylindrical, wherein at least one microwave generator and at least one RF generator are coupled to the resonant structure; generating electromagnetic fields that are coupled to the various modes of the resonant structure; and passing the process medium through said resonant structure along the axis. The process medium is fed into the structure. There may be a RF and microwave transparent pipe (low dielectric constant) running through the resonant structure (shown by the dotted lines), or it may be omitted. An input section of the pipe will in general be metal to prevent radiation out of the chamber.

A detailed description of the method and apparatus are given in the following section, along with other features, such as removal of byproducts from the coils and shielding of the device.

BRIEF DESCRIPTION OF THE DRAWINGS

Further features and advantages of the present invention will be seen from the following detailed description, taken in conjunction with the accompanying drawings, wherein.

DETAILED DESCRIPTION OF PREFERRED EMBODIMENTS

In the following description, reference is made to the accompanying drawings, which form a part hereof, and in which is shown, by way of illustration, various embodiments of the present invention. It is understood that other embodiments may be utilized and changes may be made without departing from the scope of the present invention.

Figure 1:
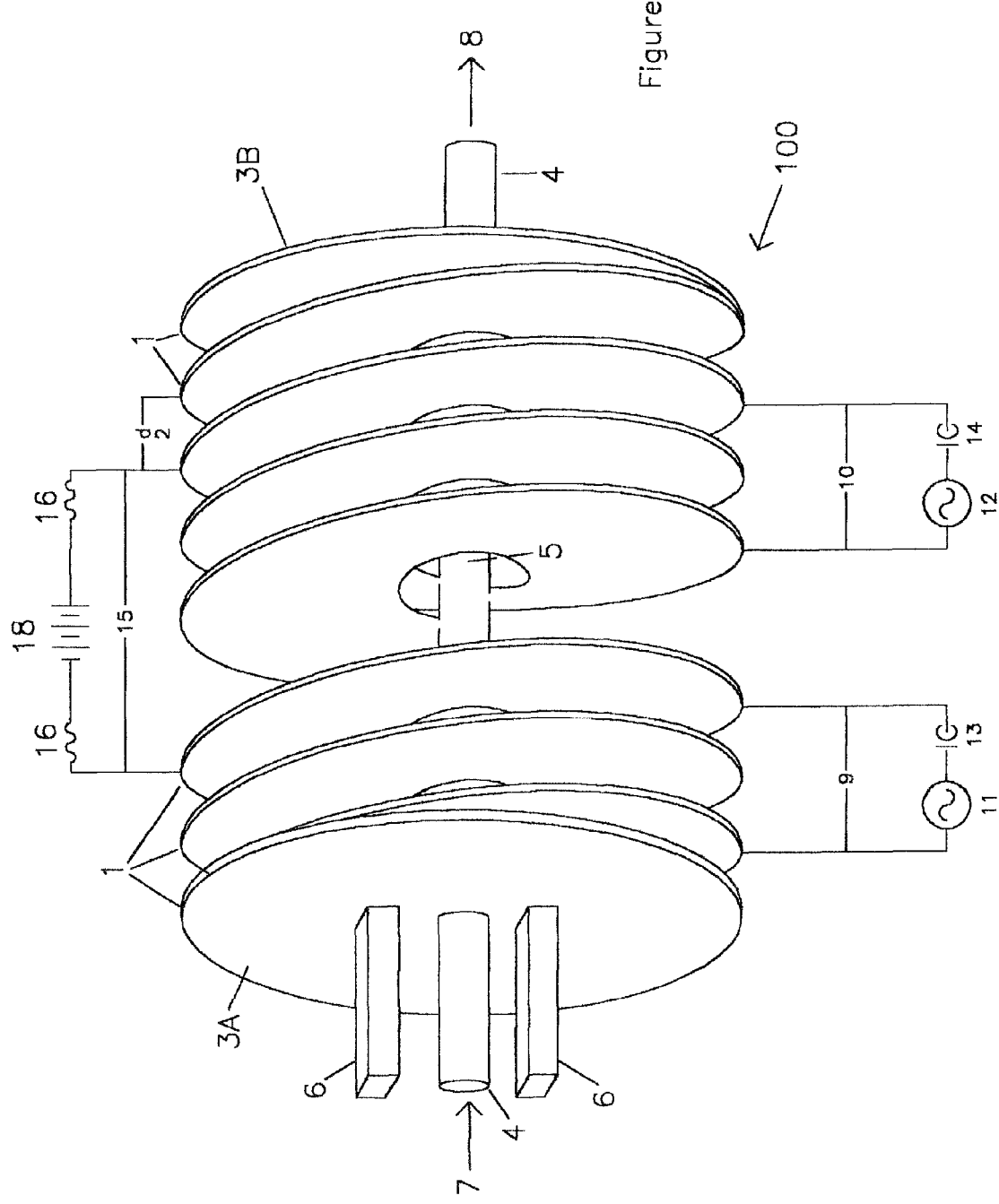
FIG. 1 is an illustration of an apparatus for treating a process volume with multiple electromagnetic generators in accordance with one aspect of the present invention.

FIG. 1 shows the general concept of the invention. A resonant cavity at microwave frequencies (there may be several different microwave frequency inputs) is formed by a conducting, metal spiral 100. The inside diameter of the spiral is chosen to support the appropriate microwave modes of a cylindrical resonator 4 with diameter equal to the inside diameter of the spiral. The length is chosen to be an integral number of half wavelengths of the input microwave frequency. Multiple microwave and multiple RF sources 11, 12 deliver power to the resonant structure. While, generally speaking, it is not possible to have a microwave cavity resonant at arbitrary input frequencies, it is one of the features of this invention that the resonant structure allows resonant modes of different frequencies. The spiral 100 is formed of a continuous electrical (and heat) conducting material, such as copper. A heat exchanger or chiller is provided to cool the coil and an acoustic source is used to remove deposits that are formed on it due to processing or reaction of the material injected into the resonant structure.

The method and apparatus of the present invention may be used to form a plasma inside the reaction chamber, whether or not a transparent pipe is used. In this instance, "transparent" means transparent with respect to the microwave and RF frequencies. When a plasma is formed, there is a short circuit of the electric field inside the plasma. Thus in this case, there cannot be an electric field (commonly denoted as the E field) along the axis. For this reason, the resonant chamber is excited so that only modes with a circumferential E field are excited. These are known as TElmn modes. In this nomenclature, the n subscript denotes length of the resonant structure in half wavelengths of the resonant mode. The "l" denotes the number of variations in the field around a circular path perpendicular to the axis, and the m denotes the number of variations in the E field in the radial direction. For all of these modes, the H field is parallel to the axis of the resonant structure.

The apparatus described herein may be used to excite the material being processed or reacted upon by means of the magnetic field, commonly denoted as the H field, which, unlike the E field, can penetrate a plasma if one is formed. The unique features of the resonant chamber allow multiple TE modes to be excited so that a plasma is more uniformly heated.

The width of the spiral winding 100 is not critical, so that a fairly wide range of microwave frequencies simultaneously can be resonant. If the modes are close in frequency, it will be advantageous to make the width of the spiral windings equal to a quarter wavelength of the resonant frequency. In this case, the spaces between the windings of the coil appear to be a short circuit to the E field inside the resonant structure. This is because the open space between the coils at the outside diameter looks like a short at the inner diameter a quarter of a wavelength away. If the resonant modes are TE modes as in this invention, the E field is circumferential, so there is little current in the longitudinal direction. The mode or modes excited in the resonator are such that the corresponding magnetic fields are parallel to the axis of the resonator and the electric field is circular, parallel to the walls. The electric field of such a mode is zero at the wall, so that currents do not need to flow in the gap between windings of the spiral.

Referring to FIG. 1, the spacing d, 2 in between the individual windings 1 of the structure is determined by several factors, including what inductance is desired for that section of the structure and the dielectric constant of the material that seals the spaces between the coils. The spacing between turns of the coil is greatly exaggerated in this figure to facilitate explanation. In actuality, the spaces would be much smaller than shown and filled with an insulator, so that the resonator has continuous walls (metal, insulator, metal, insulator, etc.). Solid metal end plates 3A, 3B are pierced by a tube or pipe 4 (whose input and output sections are metallic to prevent radiation from the resonant cavity) carrying the medium to be acted upon by the electromagnetic fields inside the resonant structure. In some embodiments, this pipe (which is transparent at the microwave and RF frequencies) is not required, and the material to be acted upon 7 fills the entire inside of the resonant structure. The dotted lines 5 of this internal pipe 4 denote that the pipe may or may not be present inside the resonant structure. The output end of the resonant structure is a solid metal cap that may be pierced by the pipe through which the material to be processed or reacted upon flows as shown by the dotted pipe. In the event the pipe is not present in the resonant cavity, there is still an external metal pipe through which the reaction or process materials exit the chamber.

The input plate 3A of the resonant structure is pierced by one or more microwave inputs, typically by waveguides 6. The input microwave frequencies are tuned to match the resonant frequency of the structure. A matching device is employed with all inputs to efficiently couple the microwaves into the resonant structure and maintain matching as the load changes.

The material to be processed or reacted upon 7 is injected into the resonant structure through a pipe 4. If it continues through the resonant structure as shown in the dotted pipe, which is transparent to the microwave and RF frequencies, the products of the process or reaction exit the resonant structure at the output 8. This output consists of both the original material and its byproducts, depending on the degree of processing or reaction.

As will be explained later, movable cylindrical, generally hollow, pistons (not shown in FIG. 1) concentric with the reaction structure axis are located at the output end of the resonant structure. Shafts to move these pistons parallel to the resonant structure axis pierce the output cap 3B. These pistons allow matching TE modes of different frequencies and different radial variations simultaneously.

Since lower frequency RF fields are more efficiently generated than microwave fields, it is desirable to add more energy to the reaction chamber with lower frequency RF sources. This is the reason for the spiral structure. The spiral forms an inductor at the RF frequencies. If an RF generator 9, 10 is connected across some of the coils 1, as shown in FIG. 1, this forms a solenoid, producing a solenoidal, or axial magnetic field directed along the axis of the resonant structure. In the event that a plasma is formed inside the resonant structure, the electric field must be zero in the plasma. Magnetic fields, however, can penetrate and add energy to the plasma. The connections are made such that the magnetic field produced by the RF generators is in the same position along the resonant structure axis as the microwave modes, thus adding more power along the axis. The various RF generators 11 and 12 can have the same or different frequencies.

Capacitors 13 and 14 are added so that the combination of the capacitor and the inductor formed by the coils of the resonant structure form a resonant circuit. The capacitors in FIG. 1 are in series with the generator and inductor, forming a series resonant circuit. In some cases, a separate capacitor is not needed. In this case, capacitance of the structure itself forms a resonant circuit along with the inductance of the turns of the coil. The capacitors may be placed in parallel instead, forming a parallel resonant RF circuit. Thus an alternating axial magnetic field is produced along the axis of the resonant structure, adding energy to the material being processed or reacted upon.

In addition to the alternating RF fields, a static or DC field can be generated along the axis by connecting a DC source or sources to the various sections of coils 15. There can be several DC sources, connected to various of the coils, or there can be a single DC source 18 connected across the entire structure. Inductors 16 are placed in series with the DC supply to protect from RF radiation. A static DC current produces a static axial field. In the case where a plasma is formed inside the resonant structure, the DC field serves to confine the produced plasma to the axis of the resonant structure, so it more efficiently can be exited by the alternating RF fields.

A round chamber as opposed to a rectangular one is preferred in that a round chamber can handle much higher powers, and the circular geometry can provide more uniform excitation of the material being processed or reacted upon.

As explained previously, several TElmn modes will be excited to provide more uniform microwave power density within the resonant structure. The various TElmn modes have maxima at different radial positions, as indicated in FIG. 2a, which shows a section through the axis of the resonant structure. Note that all the TElmn modes have a magnetic field maximum along the axis of the resonant structure. This is particularly advantageous in the case where a plasma is formed in the resonant structure. In this case TM modes, which have an E field along the axis cannot exist. However, the TE modes, which have a magnetic field along the axis can penetrate the plasma, adding additional energy to the plasma to heat it further. In many cases it is desirable to have the resonant mode be circumferentially symmetric, with no variation around the circumference. These modes are known as TEomn modes.

FIG. 2a shows a section view of the present invention parallel to the axis of the resonant structure. Two TElmn modes 21, 22 are shown having maxima at different radial positions. Mode 21 is a TEL1n mode, while mode 22, with two radial variations, is a TEL2n mode. A ring-shaped piston 23 at the maxima of the H field of mode 21 is adjusted longitudinally 24 along the length of the resonant structure to tune mode 21 to resonance. Similarly piston 25, which has two rings to coincide with the maxima of the H field of mode 22 is adjusted 26 to tune mode 22 to resonance in the structure. FIG. 2a also shows a section through the turns of the spiral coil 27 comprising the wall of the resonant structure. The pipe 28 that carries the material to be reacted upon or processed through the structure is also shown. As explained previously, the pipe, which is transparent at the microwave and RF frequencies, may or may not be present inside the resonant structure. This is denoted by the dotted line 29. In any case however, there is a metal exhaust pipe 29A. Pipe 29A is made of metal to prevent radiation out of the resonant structure. As will be explained later, the entire device also will be enclosed by an outer container, which in most cases is metallic to prevent radiation into the environment.

FIG. 2b shows a way of discriminating among various longitudinal modes. Shown is a section of a resonant structure that is many half-wavelengths long. Two modes, 29B and 29C have longitudinal maxima in different places. A screw 29D that pierces the wall of the spiral coil in this case prevents the dotted mode 29B from oscillating.

The various resonant modes are excited by microwave inputs on the input end of the device that are coincident with the appropriate TElmn mode's H field in order to couple efficiently to it.

Once the pistons are set appropriately, it is necessary to make provision at the input end of the resonant device to keep the microwave sources matched to the load as it changes. Since load changes can be rapid, as in the case where a plasma is formed suddenly, it is desirable to use a method that allows fast matching of the input. This is achieved by an input matching scheme, explained below.

The first part of the input matching scheme is to adjust the matching to the appropriate mode with a mechanical device that is electrically driven, so that it has rapid response. One of these devices is used for each microwave input. This device varies the coupling coefficient of each microwave source to the resonant structure. A coupling coefficient of one denotes perfect matching, so that no power is reflected from the resonant structure. A coupling coefficient of zero denotes that all the power is reflected from the resonant structure. It is desirable to have an electrically activated device that can be controlled by a closed loop servomechanism system.

Figure 3:
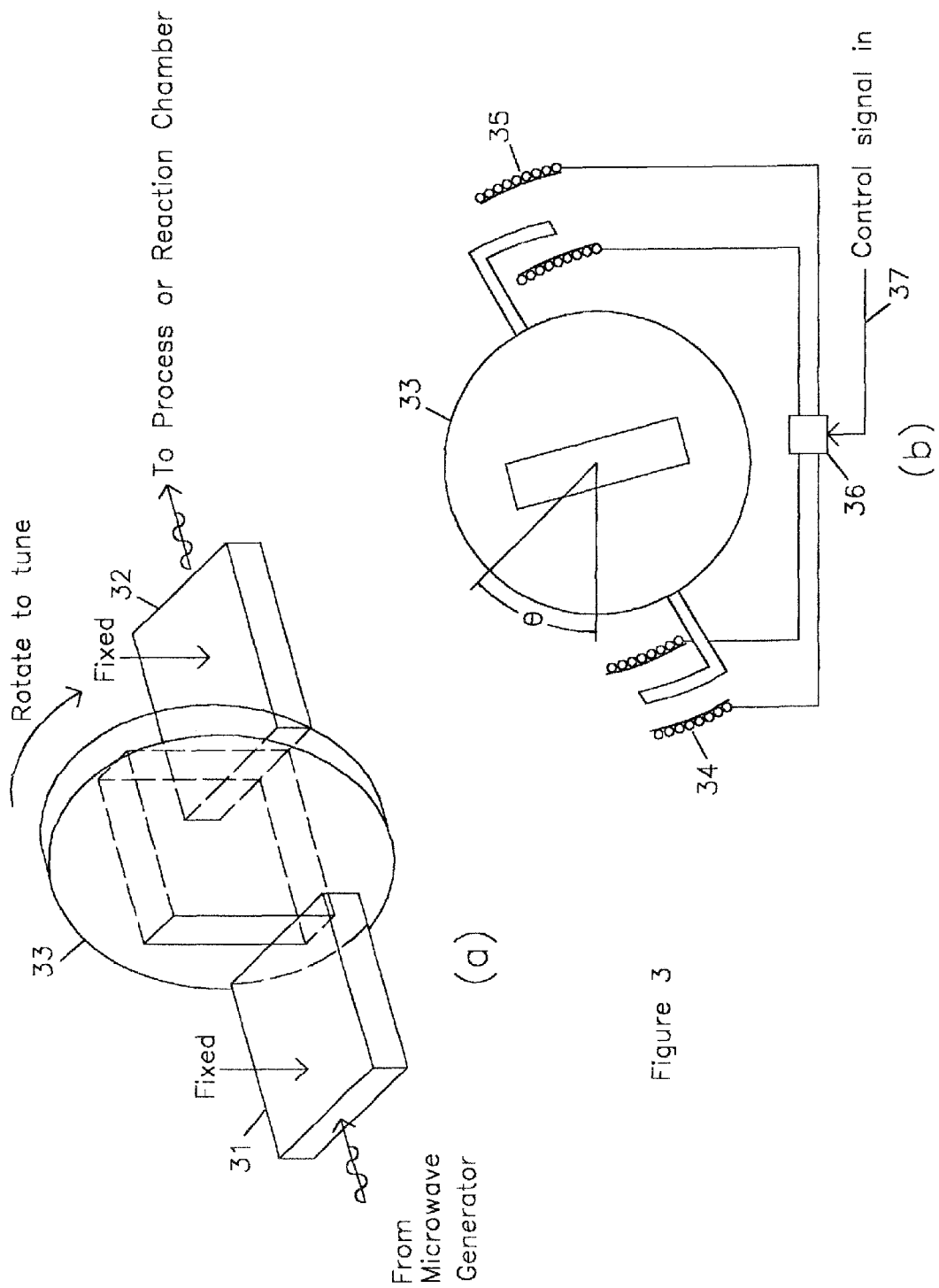
FIGS. 3A and 3B are illustrations of a matching device in accordance with one aspect of the present invention.

Operation of the matching device is as follows: Referring to FIGS. 3a and 3b, the output from the microwave generators generally is delivered to the reaction chamber by a rectangular waveguide 31 of appropriate dimensions as shown in FIG. 3a. The mode in the waveguide and its location at the input of the resonant chamber are chosen to excite the desired TElmn mode. The input hole in the input cap also is rectangular of the same dimension and is coupled typically to a second waveguide 32 of the same cross section as the waveguide from the microwave generator. The rotary tuning device 33 operates by rotating a section with the same cross section with respect to the input waveguide and the waveguide leading to the input hole. When the rotary section is aligned with the other two cross sections, the coupling coefficient is one, and it is zero if the section is rotated by 90 degrees.

FIG. 3b shows how the central rotary piece 33 can be controlled electrically by solenoids 34, 35 connected to an appropriate electronic control 36. The reflection coefficient is detected by a suitable arrangement, such as by monitoring the reflected power compared to the input power by, for example, a directional coupler and the control signal 37 drives the solenoids to maximize the forward transmitted power. In the diagram, the rotation angle theta is measured from horizontal. Values of theta near zero degrees provide the best matching to the load, with a near zero reflection coefficient. Values near 90 degrees lead to the largest reflection coefficient.

Figure 4:
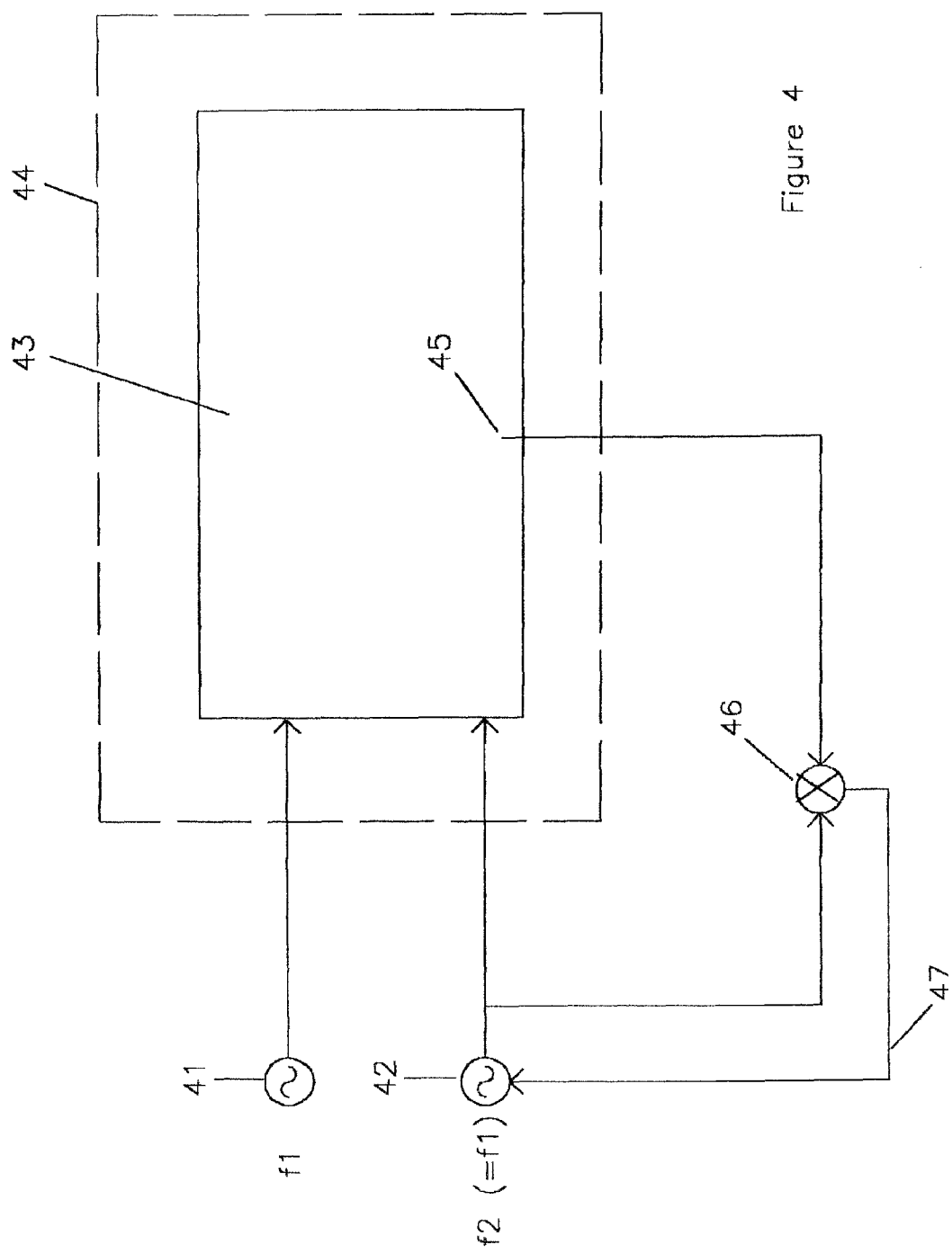
FIG. 4 is a schematic of a phase-locking device in accordance with one aspect of the present invention.

In the event that multiple generators at the same frequency are used, it is necessary to lock their phases together. This is illustrated in FIG. 4. A first generator 41, has been matched to the resonant structure. A second generator 42 is locked in phase to the first generator, so that both frequencies are the same and both generators are in phase. The resonant structure 43 is housed inside a container 44, which will be described in more detail in conjunction with FIG. 6. A sensing element 45 inside the resonant structure detects the phase of the radiation inside the resonant structure. This signal is compared with the frequency of the second generator 42 in a mixer 46. The error signal 47 from the mixer is fed back to the second microwave generator to coordinate its phase to that of the resonant structure and first generator 41. This technique is not limited to only two generators or the same frequency. Multiple generators of the same frequency can be similarly phase locked. The outputs from the individual generators have to be coupled to the same resonant structure mode. Note this locking of phases applies only to generators that have the same frequency, and hence are coupled to the same TELmn mode in the resonant structure Standard microwave techniques are employed to protect the microwave generators, such as using circulators or isolators between the generator and the load to protect the generator from large reflected powers.

In many applications of this method and apparatus, deposits will form on the resonant structure due to the process or reaction inside it. A particular case of interest is the processing of heavy hydrocarbons to break apart large molecules into simpler ones. In this case, as has been demonstrated in a prototype device to demonstrate a previous method and apparatus, as discussed in aforementioned U.S. application Ser. No. 12/234,503, carbon deposits are formed on the inside walls of the apparatus. This both reduces the effectiveness of the process and changes the matching of the resonant structure to the microwave source or sources.

Figure 5:
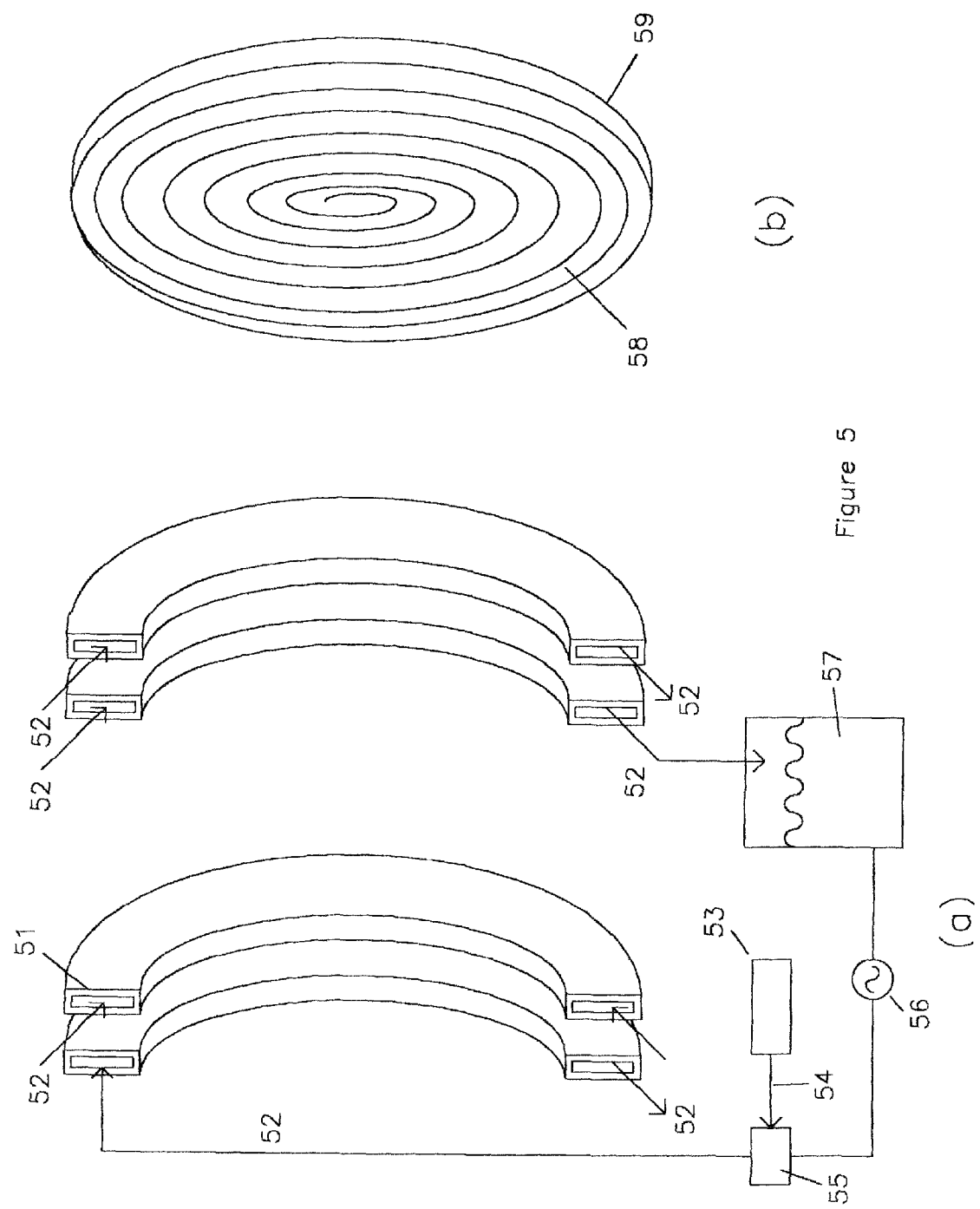
FIG. 5A is an illustration of the coils according to one aspect of the present invention.
FIG. 5B is an illustration of one of the end caps in accordance with one aspect of the present invention.

FIG. 5a shows a technique to clean the deposits off the apparatus. The turns of the coil are hollow 51, allowing water or some other liquid 52 to be circulated through the coils. An ultrasonic generator 53 applies ultrasound energy 54 by coupling a transducer 55 to the liquid circulating through the coils, and at the same time the water cools the coils. A pump 56 pumps the liquid through the coils, and the reservoir 57 also removes heat from the liquid, as for example by a chiller.

In order to reduce lossy eddy currents induced in the end caps 58 by the alternating RF field, the inside of the end caps is covered by a thin, conducting, spiral wound foil 59, as illustrated in FIG. 5b.

Figure 6:
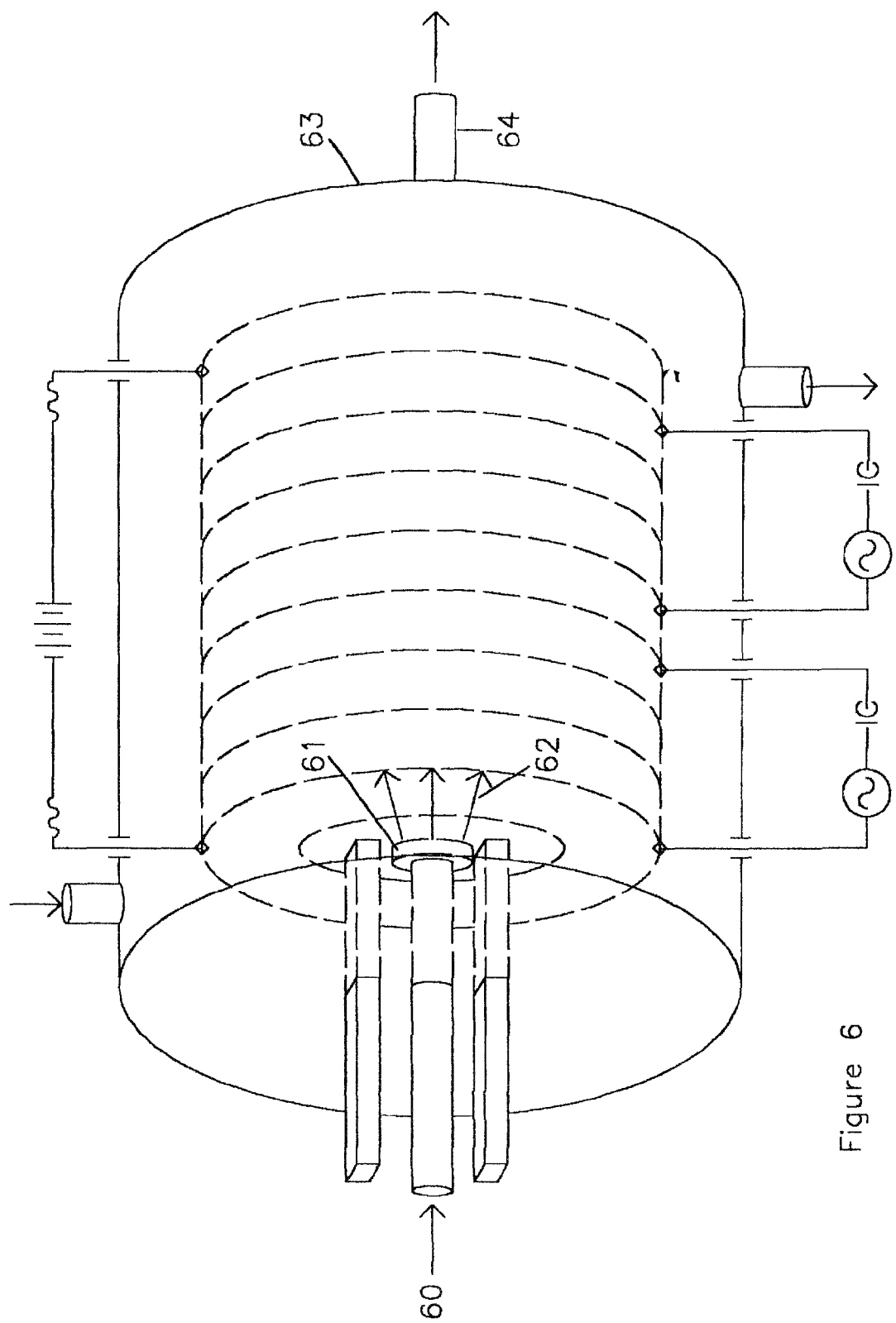
FIG. 6 is illustration of an apparatus for treating a process volume with multiple electromagnetic generators in accordance with another aspect of the present invention.

FIG. 6 shows one arrangement of the reaction chamber in the case where there is no internal tube to hold the medium being worked on. For example, the input 60 may be a liquid 60 that is atomized by an atomizer 61, which is then injected into the reaction chamber 62. In this case, the entire reaction apparatus would be enclosed in a closed container 63, as shown. The products of the process or reaction are collected through exit port 64. Various materials from the exit port are further processed as appropriate, for example to separate liquids from gasses. This closed chamber 63 can be an insulator, as glass or ceramic, or of a metal to serve as a shield to prevent RF or microwave radiation from escaping into the environment.

Figure 2:
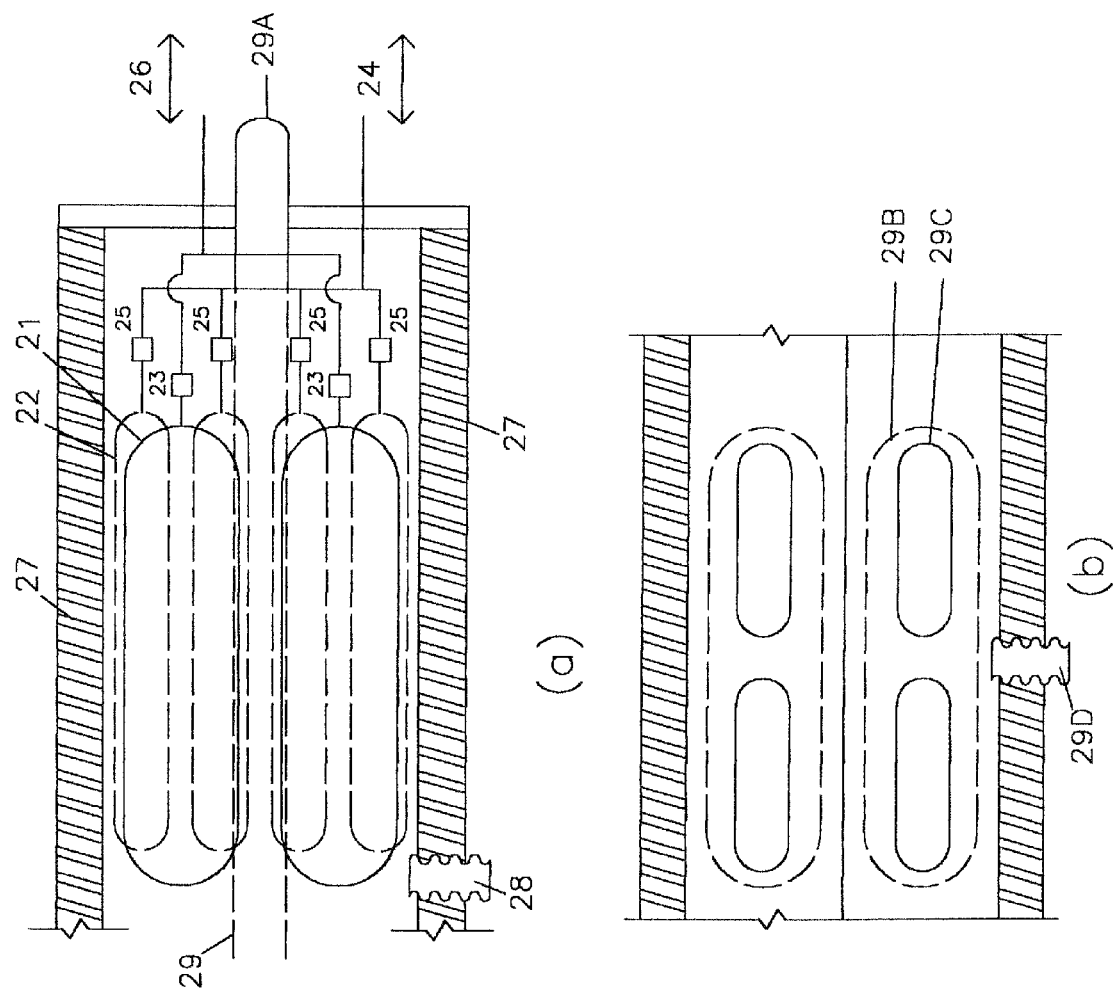
FIGS. 2A and 2B are sectioned views of the apparatus shown in FIG. 1, displaying various fields created by the electromagnetic generators.
Figure 7:
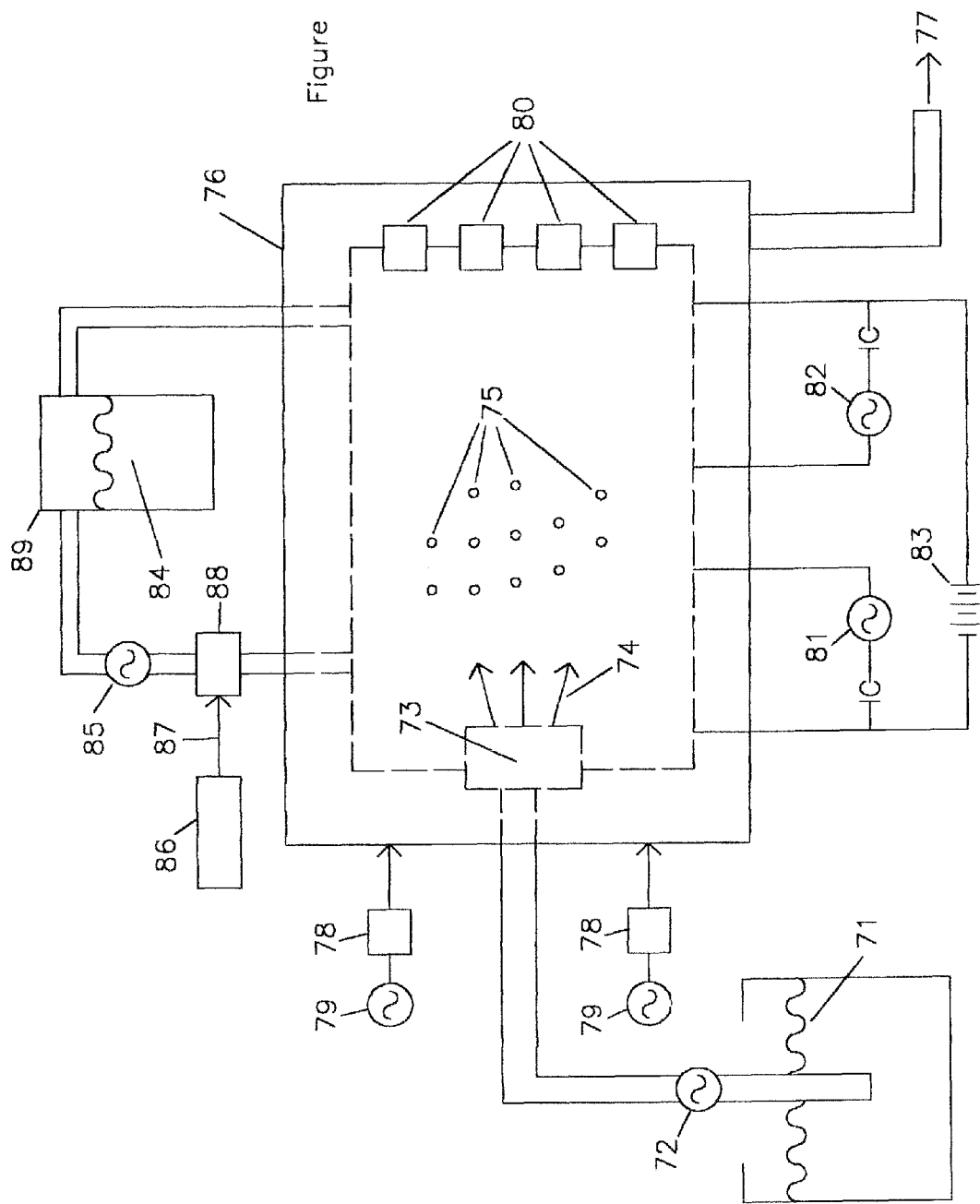
FIG. 7 is a schematic of the method and apparatus for treating a process volume with multiple electromagnetic generators in accordance with the present invention.

FIG. 7 shows some of the basic elements of the method and apparatus of the present invention. The input to the process or reaction apparatus may be for example a liquid 71. The input may also be a solid or gas or a multiple phase combination of an atomized liquid, a liquid, a gas, and/or a solid. In the case of a gas or solid, an appropriate device would be used to inject the material to be processed or reacted upon into the reaction or process apparatus. In the figure, a liquid 74 is pumped into the reaction or process apparatus by a pump 72. The liquid is atomized by an atomizer 73 and injected 74 into the reaction chamber where it is processed or reacted upon. In a case of particular interest, a plasma is established inside the reaction chamber and chemical bonds in the liquid are broken. This is desirable for example in the case of breaking bonds in heavy hydrocarbons to produce other products and to make the liquid less viscous. Output products 75 are collected by a collection chamber 76 that encloses the reaction chamber as appropriate. In the case of a liquid input, the output may in general contain both liquid and gas products, which can be separated as appropriate 77. Appropriate tunable matching devices 78 are used to couple the microwave sources 79 to the reaction apparatus. These devices were explained in conjunction with FIG. 3. Where microwave generators have the same frequency, the generators are phase locked together, as shown in FIG. 4. The movable pistons to match the various resonant modes are shown schematically in 80. As explained previously, shafts to move these pistons extend through the chamber wall. Refer to FIG. 2 for a schematic illustration of these pistons. Multiple RF generators coupled to the resonant structure to further heat the working medium are shown as 81 and 82. Provision for an axial static magnetic field is made with a DC current supply 83. A cooling liquid, which may be water or some type of cooling fluid 84, is pumped through the hollow coils by a pump 85. An ultrasonic source 86 applies ultrasonic energy 87 through a suitable transducer 88 to the liquid to cause mechanical vibration of the resonant structure coils to dislodge any material that has deposited on them. The ultrasound can be used whenever needed, whether or not the system is processing input material at the time. The reservoir 89 for the cooling liquid contains a means to remove heat from the cooling liquid, for example a heat exchanger or chiller.

It should be emphasized that the above-described embodiments of the present device and process, particularly, and "preferred" embodiments, are merely possible examples of implementations and merely set forth for a clear understanding of the principles of the invention. Many different embodiments of the method and apparatus for treating a process volume described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

The invention claimed is:

1. An apparatus for exciting a process medium with electromagnetic radiation comprising:
   a reaction structure containing a process or reaction volume;
   a plurality of generators of microwave frequency electromagnetic waves having a magnetic and an electric field, arranged around the reaction structure and coupled to the reaction structure, wherein said microwave generators are configured to excite a transverse electric resonant mode within the reaction structure and the electric field of the microwave frequency electromagnetic waves extends in a direction substantially perpendicular to an axis running lengthwise through the center of the reaction structure; and
   at least one generator of radio frequency (RF) electromagnetic waves having a magnetic and an electric field and a frequency between about 455 kHz and about 300 MHz, coupled to the reaction structure, wherein said magnetic fields of the microwave frequency electromagnetic waves and the radio frequency electromagnetic waves are substantially parallel to the axis running lengthwise through a center of the reaction structure.

2. The apparatus of claim 1, further comprising at least one static electromagnetic generator coupled to the reaction structure.

3. The apparatus of claim 2, wherein the at least one static electromagnetic generator creates a DC field to confine a plasma.

4. The apparatus of claim 1 wherein the reaction structure is single mode or multimode at a microwave frequency.

5. The apparatus of claim 1, wherein the reaction structure is cylindrically symmetric about an axis.

6. The apparatus of claim 1, wherein the reaction structure is bounded by a spiral structure formed of a conducting material and having a plurality of coils.

7. The apparatus of claim 6, wherein the width of the turns of the spiral structure is one fourth of the wavelength at the resonant frequency.

8. The apparatus of claim 6, wherein the spiral structure is connected to one or more of said radio frequency generators.

9. The apparatus of claim 6, wherein the coils form part of a resonant circuit.

10. The apparatus of claim 6, wherein the spiral structure has an end cap at each end, wherein the end caps comprise spiral windings to prevent eddy current losses.

11. The apparatus of claim 1, wherein two or more of the plurality of microwave electromagnetic generators produce microwaves at a frequency, chosen to excite various modes within the reaction structure, wherein the frequency of the microwaves from the plurality of the at least one microwave electromagnetic generators is the same.

12. The apparatus of claim 11, wherein the microwaves of the same frequency are locked in phase.

13. The apparatus of claim 12, further comprising a phase detector, from which an error signal is derived and returned to at least one of said microwave electromagnetic generators of the same frequency.

14. The apparatus of claim 1, wherein the plurality of microwave electromagnetic generators produce microwaves at different frequencies, chosen to excite various modes within the reaction structure.

15. The apparatus of claim 1, wherein the process medium is excited with an H field of TElmn modes.

16. The apparatus of claim 1, wherein said radio frequency generators are coupled to excite a region near the axis of the resonant structure.

17. The apparatus of claim 1, further comprising an ultrasound device for ultrasonic cleaning of the resonant structure.

18. The apparatus of claim 1, wherein the reaction structure is liquid-cooled.

19. The apparatus of claim 1, wherein the reaction structure is air-cooled.

20. The apparatus of claim 1, wherein the plurality of microwave electromagnetic generators are configured to excite multiple microwave modes at different longitudinal positions within the reaction structure.

21. The apparatus of claim 1, wherein the at least one RF electromagnetic generator is configured to excite multiple TElmn modes at different longitudinal positions within the reaction structure.

22. The apparatus of claim 1, further comprising at least one piston located at one end of the reaction structure to support more than one mode.

23. The apparatus of claim 22, wherein the at least one piston is used to adjust tuning of various modes.

24. The apparatus of claim 1, wherein the reaction structure comprises multiple resonant structures connected in series.

25. The apparatus of claim 1, wherein the reaction structure comprises multiple resonant structures connected in parallel.

26. The apparatus of claim 1, wherein the reaction structure comprises multiple resonant structures connected in parallel and in series.

27. The apparatus of claim 1, further comprising an electromechanical coupler for large load changes.

28. The apparatus of claim 1, further comprising a master oscillator that is adjustable to accommodate minor perturbations.

29. A method of exciting a process medium using a magnetic field, comprising:
   providing a resonant structure that is substantially cylindrical, wherein at least one microwave frequency wave generator and at least one RF wave generator are coupled to said resonant structure;
   generating electromagnetic fields that are coupled to various modes of the resonant structure; and
   passing said process medium through said resonant structure in a latitudinal direction,
   wherein said at least one microwave frequency wave generator is configured to excite a transverse electric resonant mode within the resonant structure and the electric field of the microwave frequency electromagnetic waves extends in a direction substantially perpendicular to an axis running lengthwise through the center of the resonant structure, and wherein the magnetic fields of the at least one microwave frequency electromagnetic waves and the at least one radio frequency electromagnetic waves are substantially parallel to the axis running lengthwise through a center of the reaction structure.

30. The method of claim 29, further comprising tuning said electromagnetic fields to the various modes of the resonant structure.

31. The method of claim 30, wherein the tuning is accomplished by adjusting the longitudinal position of a hollow cylindrical piston.

32. The method of claim 29, further comprising tuning said at least one microwave generator with an electromechanical coupler for large load changes.

33. The method of claim 29, wherein said process medium is a plasma, further comprising confining said plasma with DC field to enable H fields to better interact with said plasma.

34. The method of claim 29, wherein the resonant structure is bounded by a spiral structure formed of a conducting material and forming at least one coil.

35. The method of claim 34, wherein the viral structure comprises turns, and the width of the turns of the spiral structure is one fourth of the wavelength at the resonant frequency.

36. The method of claim 29, further comprising using TElmn modes to excite a medium with corresponding H fields.

\* \* \* \* \*

UNITED STATES PATENT AND TRADEMARK OFFICE
CERTIFICATE OF CORRECTION

PATENT NO. : 8,128,788 B2  Page 1 of 1
APPLICATION NO. : 12/420770
DATED : March 6, 2012
INVENTOR(S) : Proudkii et al.

It is certified that error appears in the above-identified patent and that said Letters Patent is hereby corrected as shown below:

Claim 35, Col. 12, line 43 "the viral structure" should be --the spiral structure--

Signed and Sealed this
Nineteenth Day of March, 2013

Teresa Stanek Rea
*Acting Director of the United States Patent and Trademark Office*